H. D. ARNOLD.
POWER LIMITING DEVICE.
APPLICATION FILED SEPT. 3, 1915.
1,200,796.
Patented Oct. 10, 1916.
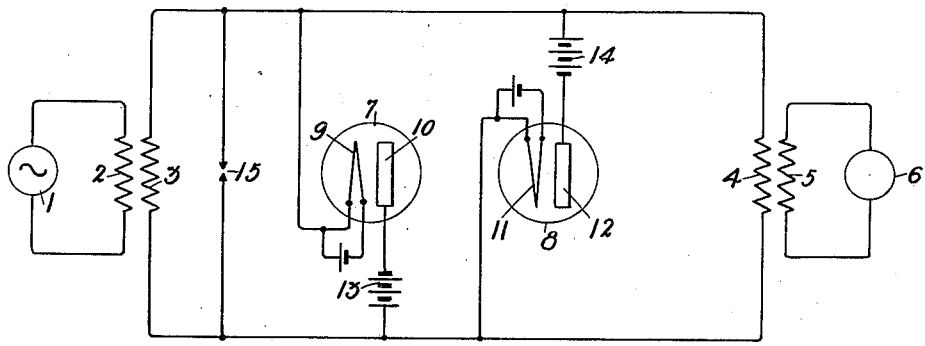
Witnesses:
Inventor:
Harold D. Arnold.
by Atty.

UNITED STATES PATENT OFFICE.

HAROLD D. ARNOLD, OF EAST ORANGE, NEW JERSEY, ASSIGNOR, BY MESNE ASSIGNMENTS, TO WESTERN ELECTRIC COMPANY, INCORPORATED, A CORPORATION OF NEW YORK.

POWER-LIMITING DEVICE.

1,200,796.

Specification of Letters Patent.

Patented Oct. 10, 1916.

Application filed September 3, 1915. Serial No. 48,872.

*To all whom it may concern:*

Be it known that I, HAROLD DE FOREST ARNOLD, a citizen of the United States, residing at East Orange, in the county of Essex and State of New Jersey, have invented certain new and useful Improvements in Power-Limiting Devices, of which the following is a full, clear, concise, and exact description.

This invention relates to power limiting devices. Its object is to limit the power which may be transferred from a source of power to a receiving circuit, that is, to insure that no power in excess of a predetermined amount shall be transferred from the source of power to the receiving circuit. This object is accomplished by making use of the fact that an electric valve or unilaterally conducting resistance, when connected in a circuit containing a battery or other source of electromotive force, said source being so poled as to tend to send current in the direction in which the valve will not pass electricity, acts as an infinite resistance to any impressed electromotive force in the opposite direction to, and less than that of said source. Such a polarized valve may, therefore, be placed as a shunt around a circuit to be protected, and will then short-circuit it for values of impressed voltage higher than and in the opposite direction to that of the polarizing battery. However, such an arrangement will act only for impressed voltages in one direction; and to secure protection against high voltages in either direction, it is necessary to add another element in shunt to the circuit to be protected and disposed in the opposite direction. In this case the circuit will be protected against high voltages in either sense, and thus the current, and hence also the power which may be transferred to a receiving circuit of a given resistance, will be limited to the value which could be transferred by a driving electromotive force approximately equal to that of either polarizing battery. These unilaterally conducting elements should have low resistances in order to act as efficient short circuits, and it has been found that thermionic devices are the most satisfactory for the protection of circuits used in signaling, to which class of circuits this device is intended to be applied. By a thermionic element is meant one consisting of a hot electron-emitting cathode and a cool anode in an evacuated vessel.

The application of this idea to alternating current circuits is shown in the drawing, in which 1 represents a generator or source of alternating current.

2 is one winding of a transformer of which 3 is the other winding, and 4 is one winding of a second transformer, whose other winding 5 is connected to the receiving device 6.

The structure next to be described is designed to limit the amount of power which can be transferred from the source 1 to the receiving device 6.

7 and 8 are thermionic elements, each consisting of an electron-emitting cathode 9 or 11, which may be heated in the usual manner, and an anode 10 or 12, each anode and cathode pair being inclosed in an evacuated vessel.

13 is a battery whose negative pole is connected to the anode 10, and 14 another battery whose negative pole is connected to the anode 12. The function of each of these batteries is to provide the polarizing electromotive force for each thermionic element. From the method of connection of batteries 13 and 14, and from the fact that the thermionic elements allow current flow only from anode to cathode, it will be apparent that with no impressed alternating voltage, no current can flow through either element. Current can flow through element 7, for example, only when the impressed voltage across the winding 3 is high enough to overcome the electromotive force of battery 13, in which case current will flow through this element from its anode to its cathode. The same remarks apply to element 8, except that in this case the impressed voltage across the winding 3 must be in the opposite direction to cause current to flow through that element.

From the foregoing discussion, it is apparent that neither element will permit the passage of current until the voltage across the transformer winding is larger than that of either battery. When the voltage is less than this, all the power generated by this source is transformed to the receiver 6; but when this alternating voltage rises above that of the battery, some current is shunted around the receiver through the thermionic elements which, therefore, act as a short circuit on winding 4. If these elements are of low resistance, it will be clear that this short-circuiting effect may be made very efficient.

A spark-gap or arrester 13 is preferably connected as shown, its function being simply to provide additional protection to the circuit against extremely high voltages.

While the transformers used in this device are not absolutely essential, still they are desirable because by means of them the impedance relations of the network may be more efficiently adjusted. For example, if the thermionic elements have, as usual, a rather high resistance, more efficient operation will be secured if the transformer 2—3 is adapted to raise the voltage to be applied across the terminals. This stepping up of the voltage also insures more effective protection by means of the spark-gap 15. The transformer 4—5 would then be used to step the voltage down again to approximately its original value. Transformers are said to be arranged in "tandem" when, as here, the output terminals of one are connected directly to the input terminals of the other.

What is claimed is:

1. A power limiting device comprising two transformers connected in tandem, unilaterally conducting thermionic elements, said elements being oppositely connected across the winding terminals common to said transformers, and a source of electromotive force in series with each of said elements.

2. In combination with a source of power and a receiving circuit, a power limiting device comprising two unilaterally conducting thermionic elements connected in parallel and in opposition, a spark-gap in parallel with said elements, a source of electromotive force in series with each of said elements, said sources tending to send currents in the directions in which said elements will not permit current flow, and two transformers with a winding of each connected across said parallel circuit, the other windings of said transformers being connected respectively to said source of power and to said receiving circuit.

In witness whereof, I hereunto subscribe my name this 31st day of August A. D., 1915.

HAROLD D. ARNOLD.